(12) United States Patent
Anders et al.

(10) Patent No.: US 11,274,628 B2
(45) Date of Patent: Mar. 15, 2022

(54) INTERNAL COMBUSTION ENGINE AND PISTON HAVING STEPPED COMBUSTION BOWL WITH NON-AXISYMMETRIC PROFILE

(71) Applicants: Caterpillar Inc., Peoria, IL (US); UChicago Argonne, LLC, Chicago, IL (US)

(72) Inventors: Jonathan William Anders, Peoria, IL (US); Naga Krishna Chaitanya Kavuri, Peoria, IL (US); Bobby John, Peoria, IL (US); Hyderuddin Mohammad, Peoria, IL (US); Chao Xu, Westmont, IL (US); Prithwish Kundu, Pimpri (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/889,958

(22) Filed: Jun. 2, 2020

(65) Prior Publication Data
US 2021/0372346 A1    Dec. 2, 2021

(51) Int. Cl.
  *F02F 3/28*  (2006.01)
  *F02F 3/20*  (2006.01)
  *F02B 23/06* (2006.01)

(52) U.S. Cl.
  CPC .............. *F02F 3/28* (2013.01); *F02B 23/0678* (2013.01); *F02B 23/0693* (2013.01); *F02F 3/20* (2013.01)

(58) Field of Classification Search
  CPC ........ F02F 3/28; F02F 3/26; F02F 3/20; F02F 3/285; F16J 1/08; F16J 1/00; F02B 23/06; F02B 23/0645; F02B 23/0669; F02B 23/0678; F02B 23/0693; F02B 23/0672; F02B 23/0696
  See application file for complete search history.

(56) References Cited

U.S. PATENT DOCUMENTS

| | | | | |
|---|---|---|---|---|
| 7,942,126 | B2* | 5/2011 | Zoller | F02B 23/0693 |
| | | | | 123/298 |
| 8,459,229 | B2* | 6/2013 | Rothbauer | F02B 23/0696 |
| | | | | 123/276 |
| 9,334,958 | B2 | 5/2016 | Schneider | |
| 10,738,682 | B2* | 8/2020 | Eismark | F02B 23/0678 |

(Continued)

FOREIGN PATENT DOCUMENTS

| | | |
|---|---|---|
| EP | 3517754 A1 | 7/2019 |
| JP | 6481968 B2 | 3/2019 |
| JP | 6508236 B2 | 5/2019 |

*Primary Examiner* — Grant Moubry
(74) *Attorney, Agent, or Firm* — Brannon Sowers & Cracraft

(57) ABSTRACT

An internal combustion engine system includes an engine housing having a combustion cylinder, and a piston movable within the combustion cylinder to increase a pressure therein to an autoignition threshold for injected fuel. The piston includes a piston crown having a combustion face forming a combustion bowl, and varied in profile to form jet-jet interaction limiters at locations offset from fuel spray jet paths from a fuel injector. The jet-jet interaction limiters include a bowl component and a step component protruding, respectively, within the combustion bowl and a step located transitioning between the combustion bowl and a circumferential rim of the piston. Limiting jet-jet interaction limits soot production in exhaust produced by the engine.

19 Claims, 7 Drawing Sheets

(56) References Cited

U.S. PATENT DOCUMENTS

| | | | |
|---|---|---|---|
| 2015/0308371 A1* | 10/2015 | Eismark | F02B 23/0627 |
| | | | 123/193.6 |
| 2018/0283315 A1* | 10/2018 | John | F02B 23/0651 |
| 2019/0003372 A1 | 1/2019 | Eismark | |
| 2020/0095922 A1* | 3/2020 | Vassallo | F02B 23/0672 |
| 2020/0141305 A1* | 5/2020 | Dembinski | F02B 23/0651 |

* cited by examiner

INTERNAL COMBUSTION ENGINE AND PISTON HAVING STEPPED COMBUSTION BOWL WITH NON-AXISYMMETRIC PROFILE This invention was made under a CRADA (No. A18047) between Caterpillar Inc. and UChicago Argonne, LLC, operator of Argonne National Laboratory for the United States Department of Energy (Contract No. DE-AC02-06CH11357). The Government has certain rights in this invention.

TECHNICAL FIELD

The present disclosure relates generally to a piston for an internal combustion engine, and more particularly to a piston having combustion face geometry for limiting interaction between spray jets of combusting fuel.

BACKGROUND

Engineering and combustion science research has focused for many years on understanding the relationships among factors such as fueling, turbocharging, variable valve actuation, exhaust gas recirculation (EGR), and a host of others with respect to emissions and efficiency. In addition to properties of engine operation such as these that can be actively controlled, especially in recent years research and testing efforts have centered around different ways that engine components, and notably pistons, can be shaped and proportioned to achieve different outcomes of combustion. One motivation driving advancements in combustion science has been the desire to reduce and/or balance relative amounts of specific emissions in engine exhaust, including particulate matter such as soot and oxides of nitrogen or NOx, without unduly impacting other parameters such as fuel efficiency and performance. It is now well understood that factors such as efficiency and emissions can be significantly affected, and often unpredictably, by seemingly minor changes in component design or operating parameters. Designs and strategies purpose-built for one application may be less well-suited to others. U.S. Pat. No. 8,978,621 to Easley et al. is directed to a piston having a combustion bowl shaped to balance combustion efficiency and emissions properties. The piston proposed in Easley has features that together desirably affect emissions such as particulate matter and NOx without unduly sacrificing fuel efficiency.

SUMMARY OF THE INVENTION

In one aspect, a piston for an internal combustion engine includes a piston crown defining a piston center axis extending between a first piston axial end, and a second piston axial end having a combustion face. The combustion face forms a combustion bowl having a center cone and a bowl peripheral edge, a circumferential rim having a rim inner peripheral edge and a rim outer peripheral edge, and a step having a first step surface transitioning with the bowl peripheral edge and a second step surface transitioning with the rim peripheral edge. The combustion face has a profile of rotation around the piston center axis that is varied to form jet-jet interaction limiters at spaced angular orientations around the piston center axis. The jet-jet interaction limiters each include a bowl component protruding, within the combustion bowl, to limit interaction between adjacent spray jets of combusting fuel advanced radially outward through the combustion bowl. The jet-jet interaction limiters each further include a step component protruding, within the step, to limit interaction between the adjacent spray jets of combusting fuel once advanced from the combustion bowl into the step and spread azimuthally.

In another aspect, an internal combustion engine system includes an engine housing having a combustion cylinder formed therein, and a fuel injector supported in the engine housing and having a plurality of spray orifices formed therein each defining a spray jet path. The engine system further includes a piston within the combustion cylinder and having a piston crown defining a piston center axis extending between a first piston axial end, and a second piston axial end having a combustion face. The combustion face forms a combustion bowl having a center cone and a bowl peripheral edge, a circumferential rim having a rim inner peripheral edge and a rim outer peripheral edge, and a step having a first step surface transitioning with the bowl peripheral edge and a second step surface transitioning with the rim inner peripheral edge. The combustion face has a profile of rotation around the piston center axis that is varied to form jet-jet interaction limiters. The jet-jet interaction limiters are arranged at locations offset from the spray jet paths and each include a bowl component protruding, within the combustion bowl, and a step component protruding, within the step, to limit interaction between adjacent spray jets of combusting fuel injected from the plurality of spray orifices.

In another aspect, a piston crown for a piston in an internal combustion engine includes a piston crown body having a piston outer surface with a top land and extending circumferentially around a piston center axis, a cooling gallery surface formed on a first axial side of the piston crown body, and a combustion face formed on a second axial side of the piston crown body. The combustion face forms a combustion bowl having a center cone and a bowl peripheral edge, a circumferential rim extending radially outward to the piston outer surface, and a step transitioning between the combustion bowl and the circumferential rim. The combustion face has a profile of rotation around the piston center axis that is varied to form jet-jet interaction limiters at spaced angular orientations around the piston center axis. The jet-jet interaction limiters each include a bowl component protruding, within the combustion bowl, and a step component protruding, within the step, to limit interaction between adjacent spray jets of combusting fuel within the combustion bowl and the step.

DETAILED DESCRIPTION

Figure 1:
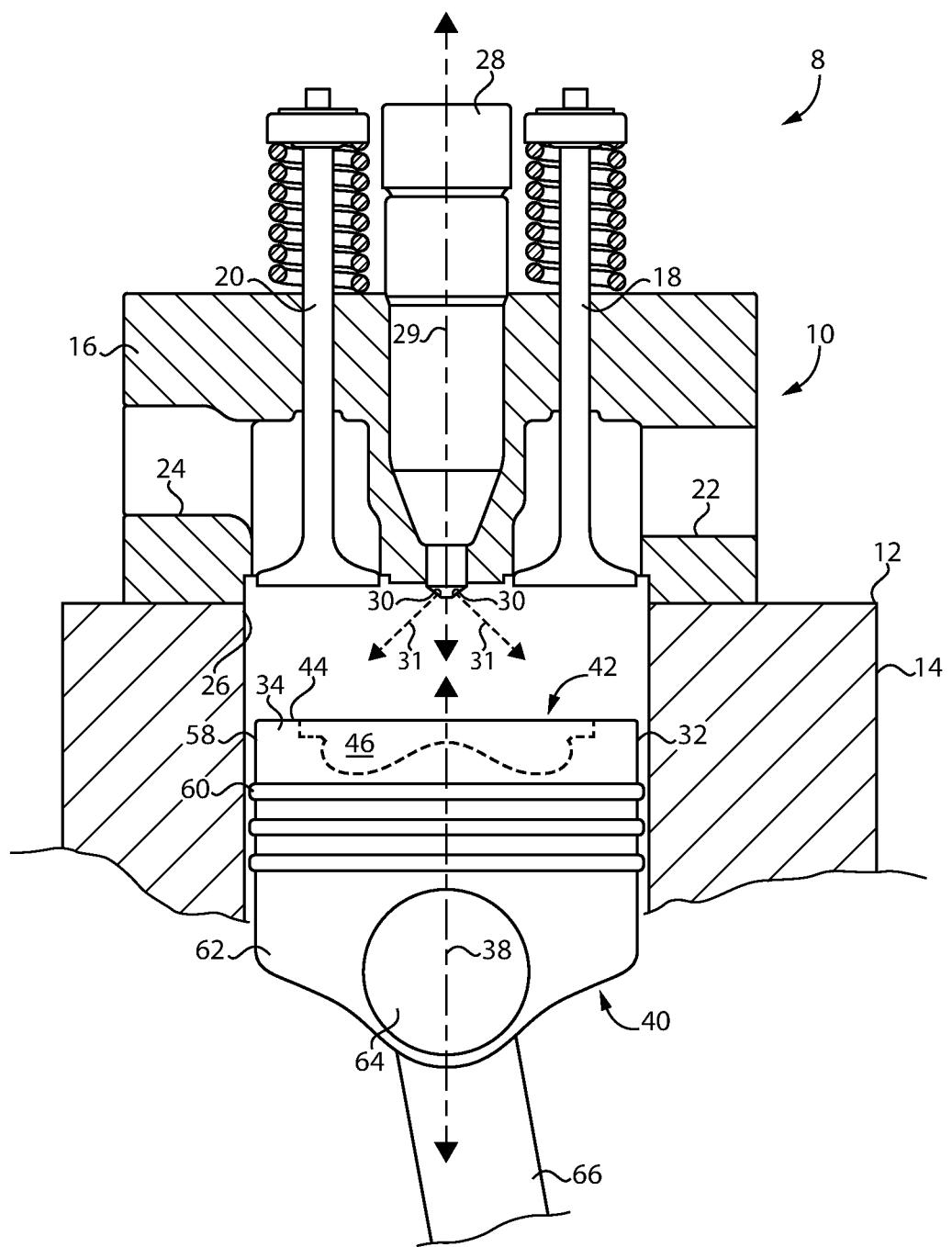
FIG. 1 is a partially sectioned side diagrammatic view of an internal combustion engine system, according to one embodiment.

Referring to FIG. 1, there is shown an internal combustion engine system 8, according to one embodiment, and including an internal combustion engine 10 having an engine housing 12 with a cylinder block 14 and an engine head 16. Engine housing 12 has a combustion cylinder 26 formed therein. A first gas exchange valve 18 and a second gas exchange valve 20 are supported in engine head 16 and movable to open and close a first gas exchange conduit 22 and a second gas exchange conduit 24, respectively. First gas exchange valve 18 might include an intake valve and second gas exchange valve 20 might include an exhaust valve, each might be an exhaust valve, or each might be an intake valve. Intake air, typically compressed by way of a turbocharger compressor, can be delivered by way of one of gas exchange conduits 22 and 24 to combustion cylinder 26, and exhaust conveyed to an exhaust system by way of the other of gas exchange conduits 22 and 24 in a generally conventional manner.

Combustion cylinder 26 may include one of a plurality of combustion cylinders in any suitable arrangement such as a V-pattern, an inline pattern, or still another. A fuel injector 28 is supported in engine housing 12, and in the illustrated case mounted in engine head 16 for direct injection of a fuel into combustion cylinder 26. Fuel injector 28 defines an injector axis 29, and has a plurality of spray orifices 30 formed therein and positioned within combustion cylinder 26. Spray orifices 30 define a plurality of spray jet paths 31 that advance radially outward and axially outward into combustion cylinder 26 relative to injector axis 29. "Axially outward" means away from a centerpoint of a line segment of an axis, whereas "axially inward" has an opposite meaning. Radially inward and radially outward are terms used conventionally herein. A piston is within combustion cylinder 26, and movable between a bottom dead center position and a top dead center position to increase a fluid pressure in combustion cylinder 26 to an autoignition threshold for injected fuel. Engine system 8 may be operable in a conventional four-stroke cycle, however, the present disclosure is not thereby limited. A wrist pin 64 is mounted in piston 32 and coupled with a connecting rod 66 which will be understood to couple with a crankshaft in a generally conventional manner. Engine 12 may be structured to operate on a suitable compression ignition fuel, such as diesel distillate fuel. As will be further apparent from the following description, engine system 8 may be uniquely configured, including by way of geometry of piston 32, for reduced amounts of soot in exhaust produced by combustion of fuel in combustion cylinder 26 and any other cylinders of engine 12 as compared to certain known strategies.

Figure 2:
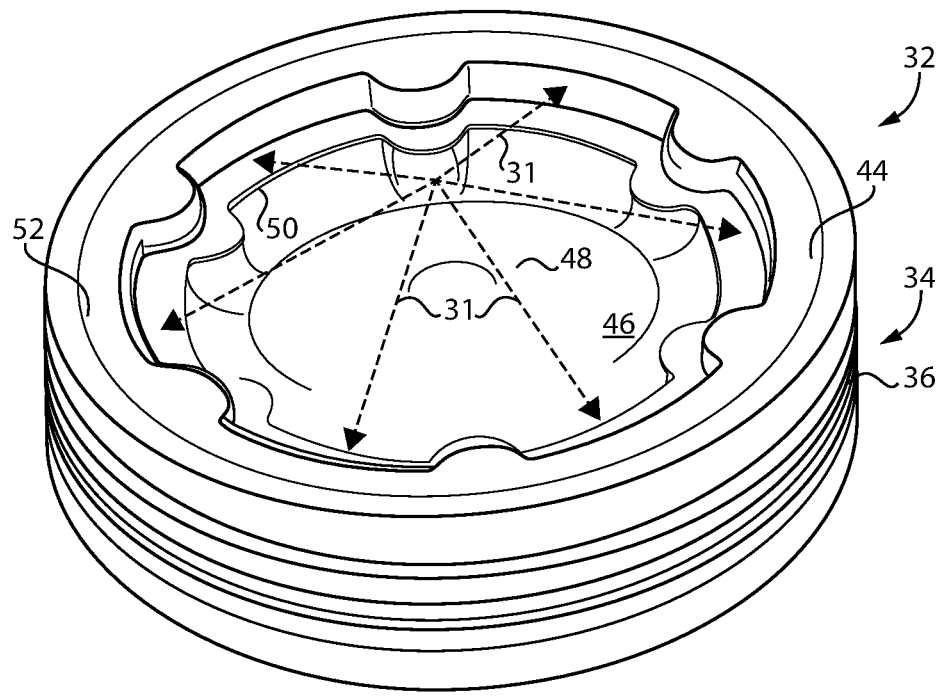
FIG. 2 is a diagrammatic view of a piston crown of a piston, according to one embodiment.
Figure 3:
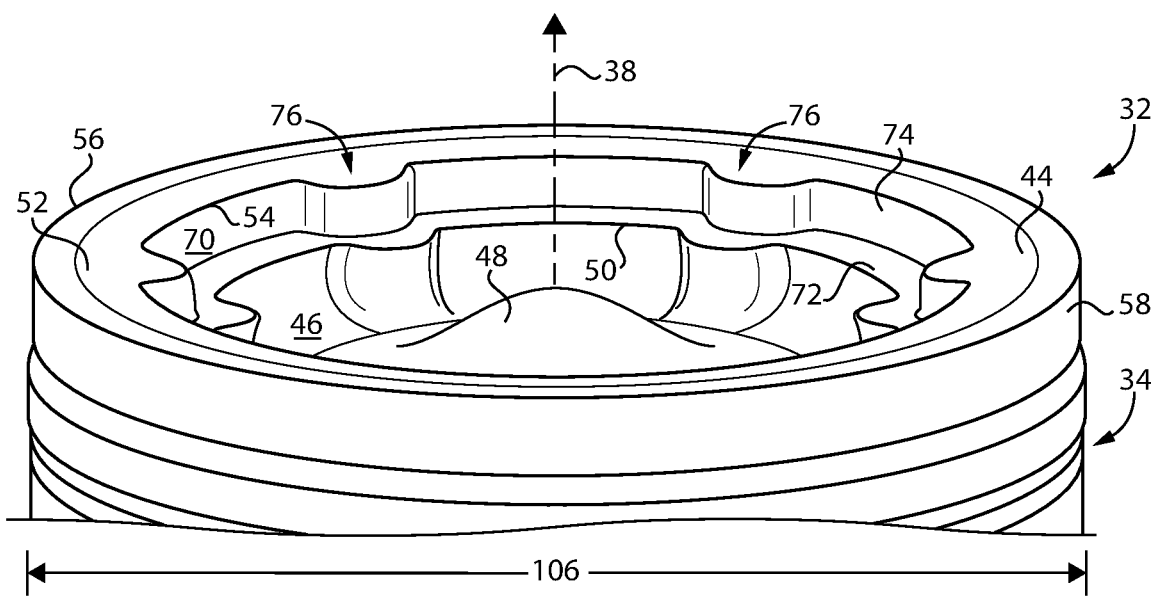
FIG. 3 is another diagrammatic view of the piston crown of FIG. 2.

Piston 32 includes a piston crown 34 defining a piston center axis 38 extending between a first piston axial end 40, and a second piston axial end 42 having a combustion face 44. First piston axial end 40 may include or be formed by a piston skirt 62 that is attached to piston crown 34 such as by welding. Piston crown 34 further includes a piston outer surface having a top land 58 extending circumferentially around piston center axis 38. One or more piston rings 60 are seated in ring grooves extending circumferentially around piston center axis 38, below top land 58. Referring also now to FIGS. 2 and 3, piston crown 34 includes a crown body 36. Description and discussion herein of piston crown 34 or piston crown body 36, or piston 32 itself, should be understood to refer interchangeably to any of these. Combustion face 44 forms a combustion bowl 46 having a center cone 48 and a bowl peripheral edge 50. Combustion face 44 further forms a circumferential rim 52 having a rim inner peripheral edge 54 and a rim outer peripheral edge 56. Combustion face 44 also forms a step 70 transitioning between combustion bowl 46 and circumferential rim surface 52, and having a first step surface 72 transitioning with bowl peripheral edge 50 and a second step surface 74 transitioning with rim inner peripheral edge 54. Circumferential rim 52 extends radially outward to the piston outer surface/top land 88. It should be appreciated that the description herein of combustion bowl 46 and step 70 refer to regions or volumes formed by those features and not the individual surfaces thereof.

Combustion face 44 has a profile of rotation around piston center axis 38 that is varied, meaning that combustion bowl 46 and step 70 are not axisymmetric. The varied profile of rotation of combustion face 44 forms jet-jet interaction limiters 76 at spaced angular orientations around piston center axis 38. It can also be noted from FIG. 2 that spray jet paths 31 are shown and in an alternating arrangement with jet-jet interaction limiters 76. Jet-jet interaction limiters 76 being arranged at locations offset from spray jet paths 31 means that injected spray jets of fuel will be targeted at locations between jet-jet interaction limiters 76. Spray jet paths 31 may intersect piston 32, in an axial projection, at locations equidistant from adjacent jet-jet interaction limiters 76. It has been discovered that limiting interaction between spray jets of combusting fuel can advantageously limit production of soot in at least some instances. As further discussed herein, the limiting of interaction can include limiting merging of pockets of soot formed or forming within the individual spray jets of combusting fuel, or limiting merging of regions of the spray jets of combusting fuel where soot formation is likely or can be expected.

In a practical implementation strategy, a number of jet-jet interaction limiters 76 is from 3 to 8. In a refinement, a number of jet-jet interaction limiter 76 is from 5 to 7, and is 6 in the illustrated embodiment. Jet-jet interaction limiters 76 may be regularly spaced around piston center axis 38, and thus locations of jet-jet interaction limiters 76 are offset from one another by 60° in the illustrated embodiment. Analogously, spray jet paths 31 may be regularly spaced circumferentially around injector axis 29, and can be arranged such that each spray jet path 31 targets a location upon piston 32 that is halfway between adjacent jet-jet interaction limiters 76.

It can be noted from the illustrations that jet-jet interactions limiters 76 may be formed in part within combustion bowl 46 and in part within step 70. It has been determined that limiting jet-jet interaction during an incipient portion of injection of a spray jet, where the spray jet of combusting fuel is within combustion bowl 46, as well as limiting jet-jet interaction where the spray jet has advanced onto and into step 70 can be advantageous. Among other things, this strategy is believed to optimize contact between the combusting fuel and available oxygen within the combustion space rather than permitting merging and enlargement of regions where oxygen access may be limited and thus soot production promoted. To this end, jet-jet interaction limiters 76 each include a bowl component 78 protruding, within combustion bowl 46, to limit interaction between adjacent spray jets of combusting fuel advanced radially outward through combustion bowl 46. Jet-jet interaction limiters 76 each further include a step component 80 protruding, within step 70, to limit interaction between the adjacent spray jets of combusting fuel once advanced from combustion bowl 46 into step 70 and spread azimuthally. The phenomena and mechanisms relating to limiting of jet-jet interaction of combusting fuel spray jets will be further apparent by way of discussion below.

Figure 4:
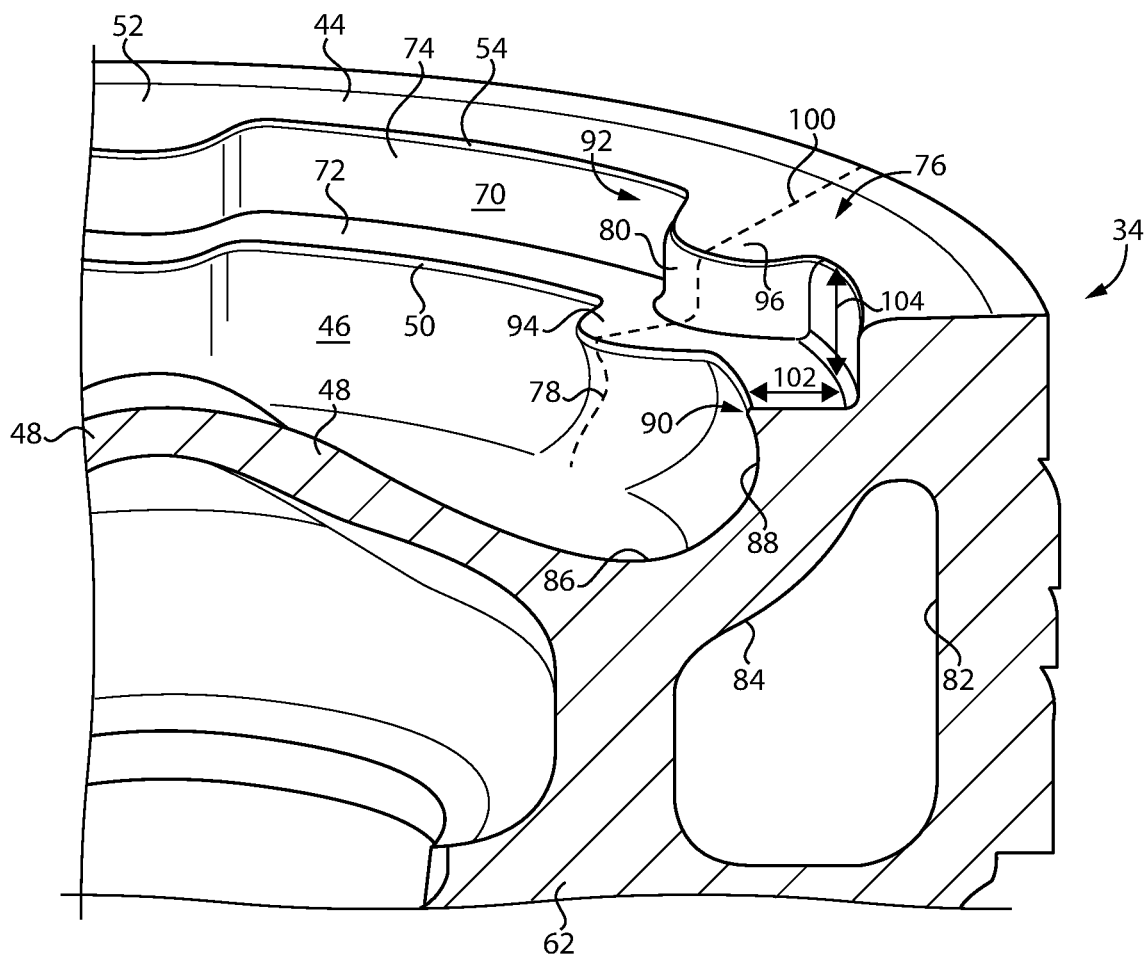
FIG. 4 is a sectioned diagrammatic view of a portion of the piston crown of FIGS. 2 and 3.

Referring also now to FIG. 4, in the illustrated embodiment, bowl component 78 and step component 80 in each of jet-jet interaction limiters 76 are symmetric about a common plane of symmetry 100 that is parallel to and intersects piston center axis 38. A dashed line is shown in FIG. 4 illustrative of the subject plane of symmetry, and it will be appreciated that in a top view, an axial projection, each jet-jet interaction limiter 76 is left-right symmetric about plane 100. Plane 100 includes and intersects piston center axis 38. It will also be noted that bowl component 78 and step component 80, are rounded in an axial projection, and may have generally semi-circular profiles in an axial projection. FIG. 4 also illustrates an oil gallery 83 formed in part by piston crown 34, upon a first axial side thereof, and also in part by piston skirt 62. Combustion face 44 is upon a second axial side of piston crown 44. A backside cooling surface 84 is positioned opposite to combustion bowl 46 such that heat of combustion is dissipated through a material thickness of piston crown 34 between combustion bowl 46 and cooling gallery 82.

As can also be seen from the drawings, and FIG. 4 in particular, combustion face 44 has a combustion face profile at locations of jet-jet interaction limiters 76, and also at locations circumferentially between jet-jet interaction limiters 76. In the illustrated embodiment, the combustion face profile includes a limiter profile at locations of jet-jet interaction limiters, and a base profile at locations circumferentially between jet-jet interaction limiters 76. The limiter profile can be understood to be a profile, of rotation about piston center axis 38, at a location of plane 100, for example. The base profile is the profile that can be observed approximately at the section plane shown in FIG. 4. The limiter profile is congruous with the base profile in the illustrated embodiment. Congruous means substantially in agreement, although not necessarily perfectly in agreement. It will thus further be understood that the combustion face profile may be substantially identical at the locations of jet-jet interaction limiter 76 and at the locations between jet-jet interaction limiter 76, but shifted in a radial direction. In other embodiments, the limiter profile and the base profile could be different. For example, in some instances it might be desirable to provide for relatively more or less volume within step 70, and an arcuate path, or otherwise a shape, of second step surface 74 might be varied between an adjacent jet-jet interaction limiters 76 to provide more or less volume scooped out of piston 32 adjacent to circumferential rim 52. It might also be desirable to vary the shape of a transition between bowl component 78 and step component 80.

Bowl component 78 and step component 80 may be disjunctive, as shown, or conjunctive and continuous between a bowl floor 86 and circumferential rim 52. Combustion bowl 46 includes bowl floor 86, and also a bowl outer wall 88 extending between bowl floor 86 and bowl peripheral edge 50. Bowl outer wall 88 may extend from bowl floor 86 to bowl peripheral edge 50. Bowl component 78 of each of jet-jet interaction limiters 76 may extend axially between bowl floor 86 and bowl peripheral edge 50, and radially inward from bowl outer wall 88. Bowl component 78 may further extend fully axially from bowl floor 86 to bowl peripheral edge 50. Step component 80 may extend axially between first step surface 72 and rim inner peripheral edge 54, and radially inward from second step surface 74. Step component 80 may further extend fully from first step surface 72 to rim inner peripheral edge 54. It can thus be seen that in the illustrated embodiment first step surface 72 is formed in part upon bowl component 78 of each of jet-jet interaction limiters 76. Circumferential rim 52 is formed in part upon step component 80 of each of jet-jet interaction limiters 76. A protruding portion 94 of first step surface 72 is shown upon bowl component 78 in FIG. 4. A protruding portion 96 of circumferential rim 52 is shown upon step component 80 in FIG. 2. First step surface 72 may be planar and oriented normal to piston center axis 38. Second step surface 74 may be circular and oriented parallel to piston center axis 38.

Further shown in FIG. 4 is a first radius of curvature 90 defined by bowl peripheral edge 50 and a second radius of curvature 92 defined by rim inner peripheral edge 54. Second radius of curvature 92 may be larger than first radius of curvature 90. It has been discovered that a sharp radius of curvature at a bowl peripheral edge can assist in detachment of a spray jet of combusting fuel from combustion face 44, facilitating mixing with available oxygen as further discussed herein. Accordingly, first radius of curvature 90 may be quite small, for example 2 millimeters or less, and can include a deburred edge in some embodiments. Combustion bowl 46 may also be reentrant consistent with principles of promoting some detachment of a spray jet of combusting fuel and avoiding advancement of a spray jet out of stop 70 and toward a cylinder liner wall.

FIGS. 3 and 4 also illustrate certain dimensional and proportional attributes of piston 32. First step surface 72 may extend from bowl peripheral edge 50 to second step surface 74 and defines a step width dimension 102. Second step surface 74 extends from first step surface 72 to rim inner peripheral edge 54 and defines a step depth dimension 104. Top land 58 extends circumferentially around piston center axis 38 and thus defines a piston diameter dimension 106. Each of step width dimension 102 and step depth dimension 104 may be from about 3% to about 8% of piston diameter dimension 106. These proportional attributes are considered to provide a sufficient volume of step 70 to participate in the combustion process consistent with the principals set forth herein, without unduly interfering with compression ratio or creating other challenges. As used herein the term "about" should be understood to mean generally or approximately. For example, about 3 might mean from 2.5 to 3.4, consistent with conventional rounding to a consistent number of significant digits. The relative proportions associated with step 70 can be expected to scale to relatively larger piston sizes as well as relatively smaller piston sizes.

INDUSTRIAL APPLICABILITY

Figure 5:
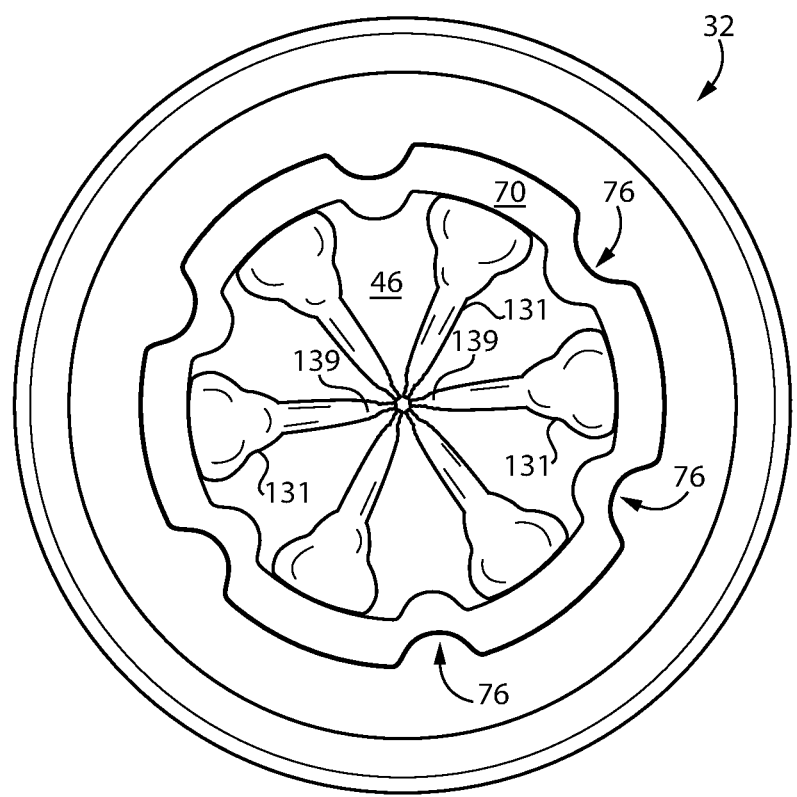
FIG. 5 is a top view of a piston showing spray jets of combusting fuel at one stage of combustion.
Figure 6:
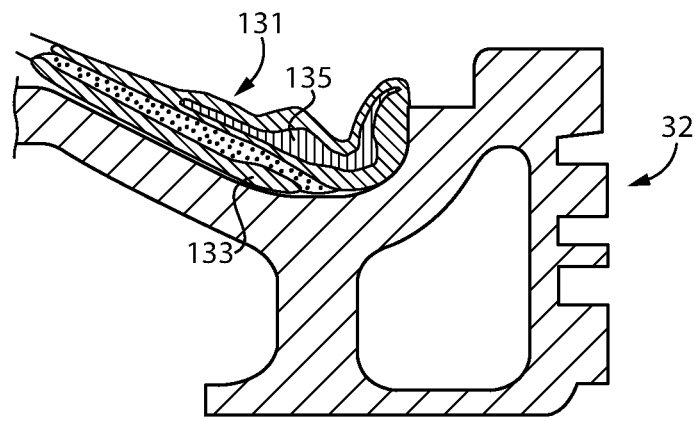
FIG. 6 is a sectioned view through a portion of the piston of FIG. 5.

Referring now to FIG. 5, there is shown a view of piston 32 as it might appear where a plurality of spray jets 131 of combusting fuel have been injected into combustion cylinder 26 and are advancing outwardly in combustion bowl 60. The engine timing at which conditions appear as depicted in FIG. 5 could vary depending upon such factors as a timing of injection, engine speed, injection pressure, boost pressure, etc., but might be observed a few degrees before a top dead center position of piston 32 in a compression stroke. Spray jets 131 have advanced radially outward and axially downward from spray orifices 30 and have begun to move upwardly along outer wall 88 from bowl floor 86. Referring to FIG. 6, there is shown a sectioned view of what might be observed within a spray jet 131 corresponding to FIG. 5. A hotter core region 135 of spray jet 131 is surrounded generally be a cooler second region 133. As can also be seen in FIG. 5 a lift off length of spray jets 131 is shown at 139 and represents fuel not yet combusting, whereas the remainder of spray jets 131 can be understood as actively combusting.

Figure 7:
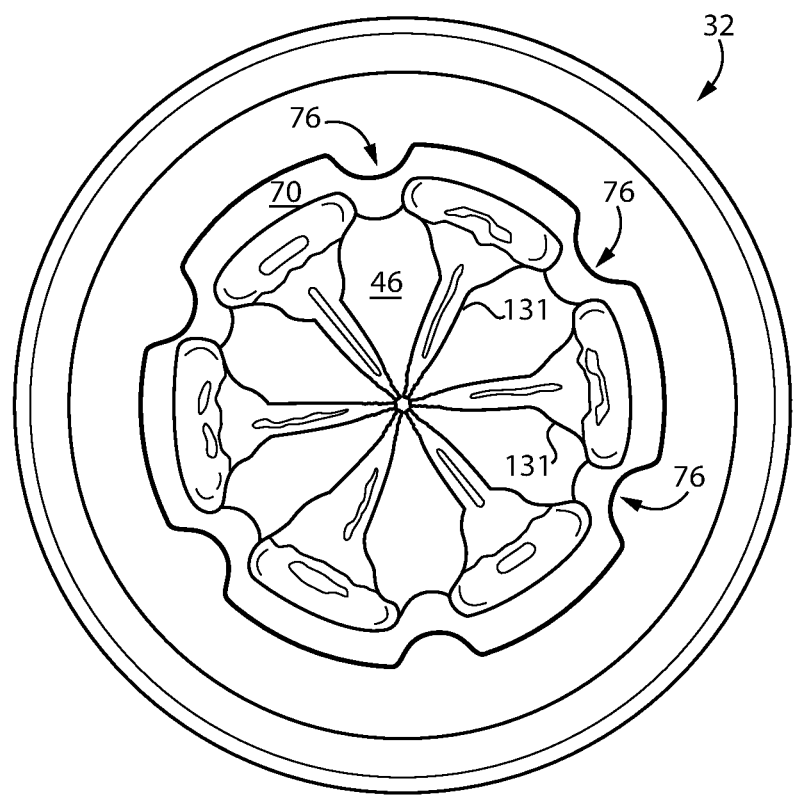
FIG. 7 is a diagrammatic view of a piston showing spray jets of combusting fuel at another stage of combustion.
Figure 8:
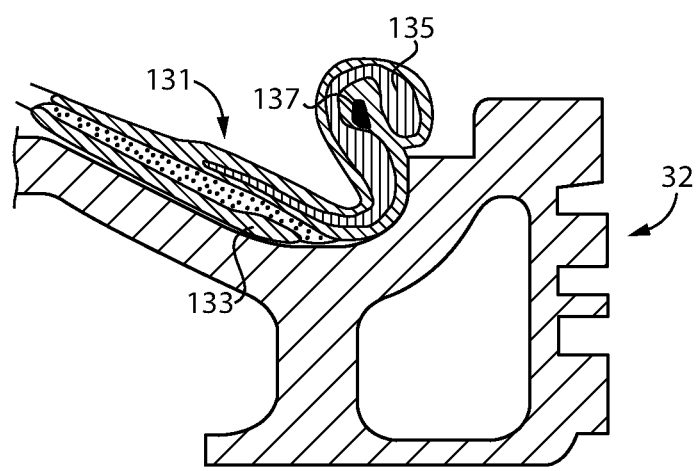
FIG. 8 is a sectioned view through a portion of the piston of FIG. 7.

In FIG. 7 and FIG. 8, there can be seen a subsequent stage where spray jets 131 have begun to advance out of combustion bowl 46 and approach or begin to enter into step 70. It can be seen that some azimuthal spread of spray jets 131 is occurring. It can also be noted from FIG. 8, that a soot region 137 has begun to form, and the spray jet 131 has begun to detach from combustion face 44. Jet-jet interaction limiters 76 are preventing interaction between spray jets 131 that might otherwise be observed.

Figure 9:
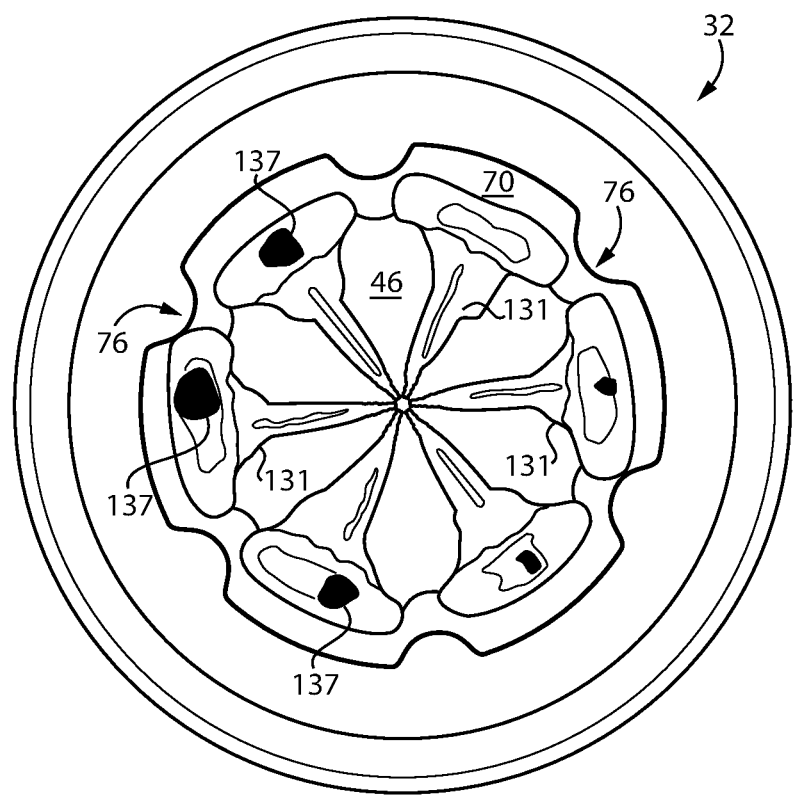
FIG. 9 is a diagrammatic view of a piston showing spray jets of combusting fuel at yet another stage of combustion.
Figure 10:
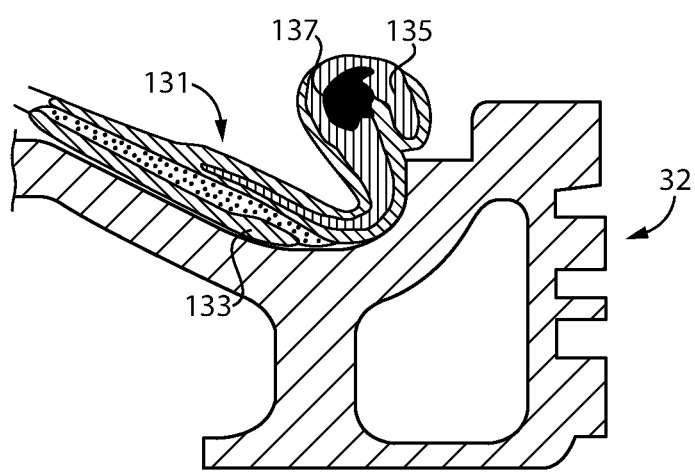
FIG. 10 is a sectioned view through a portion of the piston of FIG. 9.

In FIGS. 9 and 10, at a further subsequent stage there it can be seen that additional azimuthal spreading has occurred in step 70, with spray jets 131 beginning to encounter both bowl component 78 and step component 80 of jet-jet interaction limiters 76. Soot pocket 137 has enlarged somewhat and is still largely surrounded by actively combusting fuel spray. As the jets come out over bowl peripheral edge 50, approximately as depicted in FIGS. 9 and 10, spray jets 131 begin to spread in all directions, including more robustly azimuthally into step 70. Access to air in step 70 helps maintain combustion and soot oxidation. While soot regions 137 have further expanded somewhat from the previous stages they remain are prevented from merging jet-jet.

Figure 11:
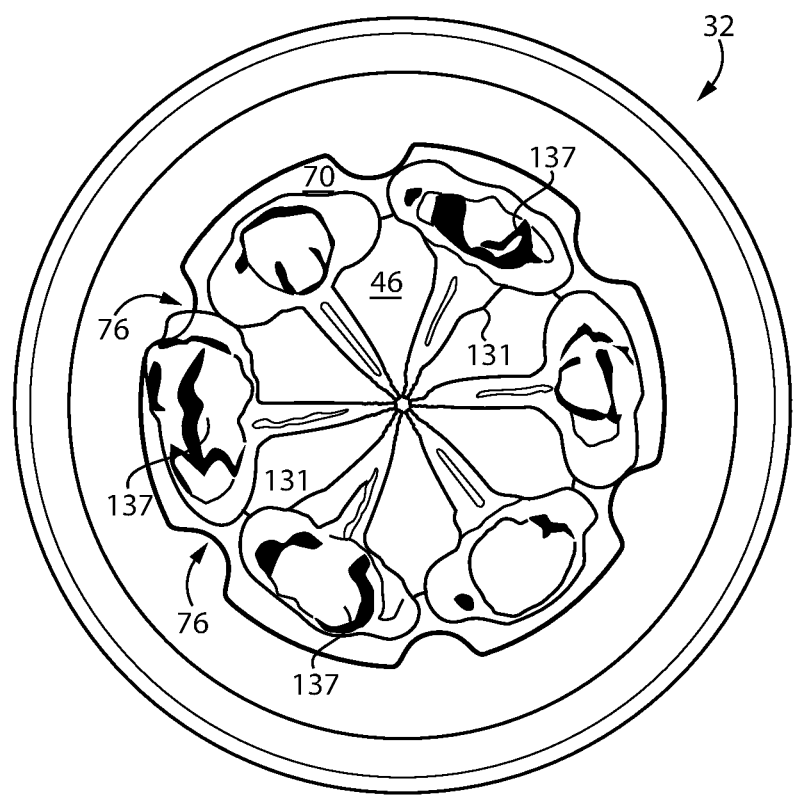
FIG. 11 is another diagrammatic view of a piston showing spray jets of combusting fuel at yet another stage of combustion.
Figure 12:
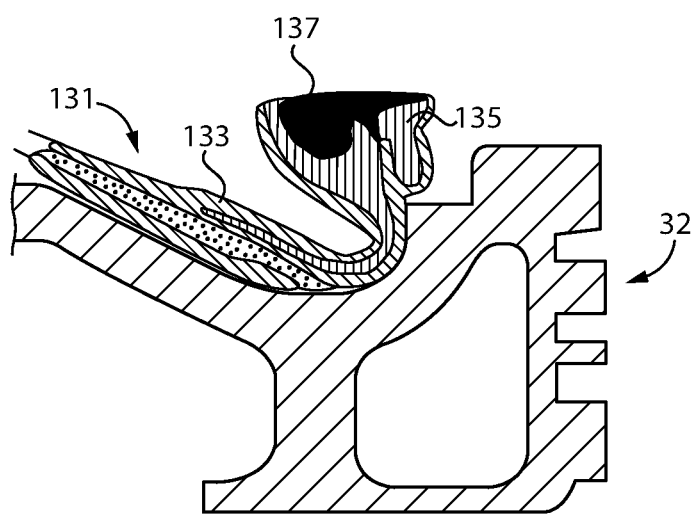
FIG. 12 is a sectioned view through a portion of the piston of FIG. 11.

In FIGS. 11 and 12, depicting a further subsequent stage that might be observed a few degrees after a top dead center position of piston 32, jet-jet interaction limiters 76 continue to help to maintain jet-jet separation, such that regions of high soot in spray jets 131 do not interact. Some advancement of spray jet 131 can be observed up onto circumferential rim 52, however, it can be noted that combustion is substantially maintained still within combustion bowl 46 and step 70.

Following the state depicted in FIGS. 11 and 12, portions of spray jets 131 that have stayed in combustion bowl 46 and step 70 can begin to be directed back towards the center of combustion cylinder 26 by jet-jet interaction limiters 76. Spray jets 131 will eventually merge with neighboring or adjacent spray jets both in combustion bowl 46 and in step 70, however jet-jet interaction limiters 76 have prevented high soot regions, richer regions, of spray jets 131 from merging with neighboring jets and in particular neighboring high soot regions, and thus facilitated better access to air in step 70, above combustion bowl 46, and between spray jets 131. By limiting jet-jet interaction according to the principles discussed herein, it is believed that overall soot production will be reduced as compared to combustion that would take place in a traditional axisymmetric combustion bowl.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A piston for an internal combustion engine comprising:
a piston crown defining a piston center axis extending between a first piston axial end, and a second piston axial end having a combustion face;
the combustion face forming a combustion bowl having a center cone and a bowl peripheral edge, a circumferential rim having a rim inner peripheral edge and a rim outer peripheral edge, and a step having a first step surface transitioning with the bowl peripheral edge and a second step surface transitioning with the rim inner peripheral edge;
the combustion face having a profile of rotation around the piston center axis that is varied to form jet-jet interaction limiters at spaced angular orientations around the piston center axis;
the jet-jet interaction limiters each including a bowl component protruding, within the combustion bowl, to limit interaction between adjacent spray jets of combusting fuel advanced radially outward through the combustion bowl; and
the jet-jet interaction limiters each further including a step component protruding, within the step, to limit interaction between the adjacent spray jets of combusting fuel once advanced from the combustion bowl into the step and spread azimuthally.

2. The piston of claim 1 wherein the bowl component and the step component are rounded, in an axial projection, and the bowl component and the step component in each of the jet-jet interaction limiters are symmetric about a common plane of symmetry that is parallel to and intersects the piston center axis.

3. The piston of claim 2 wherein:
the combustion bowl includes a bowl floor and a bowl outer wall extending from the bowl floor to the bowl peripheral edge;
the bowl component of each of the jet-jet interaction limiters extends axially between the bowl floor and the bowl peripheral edge, and radially inward from the bowl outer wall; and
the step component extends axially between the first step surface and the rim inner peripheral edge and radially inward from the second step surface.

4. The piston of claim 3 wherein the first step surface is formed in part upon the bowl component of each of the jet-jet interaction limiters, and the circumferential rim is formed in part upon the step component of each of the jet-jet interaction limiters.

5. The piston of claim 1 wherein:
the first step surface extends from the bowl peripheral edge to the second step surface and defines a step width dimension;
the second step surface extends from the first step surface to the rim inner peripheral edge and defines a step depth dimension; and
a top land extends circumferentially around the piston center axis and defines a piston diameter dimension.

6. The piston of claim 5 wherein each of the step width dimension and the step depth dimension is from about 3% to about 8% of the piston diameter dimension.

7. The piston of claim 1 wherein the combustion face profile includes a limiter profile at locations of the jet-jet interaction limiters and formed by each respective bowl component and step component, and a base profile at locations circumferentially between the jet-jet interaction limiters, and the limiter profile is congruous with the base profile.

8. The piston of claim 7 wherein a number of the jet-jet interaction limiters is from 3 to 8 and the jet-jet interaction limiters are in a regular distribution around the piston center axis.

9. The piston of claim 7 wherein the bowl peripheral edge defines a first radius of curvature, and the rim inner peripheral edge defines a second radius of curvature that is larger than the first radius of curvature, and wherein the combustion bowl is reentrant.

10. An internal combustion engine system comprising:
an engine housing having a combustion cylinder formed therein;
a fuel injector supported in the engine housing and having a plurality of spray orifices formed therein each defining a spray jet path; and
a piston within the combustion cylinder and including a piston crown defining a piston center axis extending between a first piston axial end, and a second piston axial end having a combustion face;
the combustion face forming a combustion bowl having a center cone and a bowl peripheral edge, a circumferential rim having a rim inner peripheral edge and a rim outer peripheral edge, and a step having a first step surface transitioning with the bowl peripheral edge and a second step surface transitioning with the rim inner peripheral edge;
the combustion face having a profile of rotation around the piston center axis that is varied to form jet-jet interaction limiters;
the jet-jet interaction limiters being arranged at locations offset from the spray jet paths and each including a bowl component protruding, within the combustion bowl to limit interaction between adjacent spray jets of combusting fuel injected from the plurality of spray orifices advanced radially outward through the combustion bowl, and a step component protruding, within the step, to limit interaction between the adjacent spray jets of combusting fuel once advanced from the combustion bowl into the step and spread azimuthally; and
the combustion face profile includes a limiter profile at locations of the jet-jet interaction limiters, and a base profile at locations circumferentially between the jet-jet interaction limiters, and the limiter profile is congruous with the base profile.

11. The engine system of claim 10 wherein a number of each of the spray orifices and the jet-jet interaction limiters is from 3 to 8, and the spray jet paths and the jet-jet interaction limiters are in an alternating arrangement circumferentially around the piston center axis.

12. The engine system of claim 11 wherein the spray jet paths intersect the piston, in an axial projection, at locations equidistant from adjacent ones of the jet-jet interaction limiters.

13. The engine system of claim 10 wherein the bowl component and the step component have rounded shapes, in an axial projection, and the bowl component and the step component in each of the jet-jet interaction limiters are symmetric about a common plane of symmetry that is parallel to and intersects the piston center axis.

14. The engine system of claim 13 wherein:
the combustion bowl includes a bowl floor and a bowl outer wall extending from the bowl floor to the bowl peripheral edge;
the bowl component of each of the jet-jet interaction limiters extends axially between the bowl floor and the bowl peripheral edge, and radially inward from the bowl outer wall;
the step component extends axially between the first step surface and the rim inner peripheral edge and radially inward from the second step surface; and
the first step surface is formed in part upon the bowl component of each of the jet-jet interaction limiters, and the circumferential rim is formed in part upon the step component of each of the jet-jet interaction limiters.

15. The engine system of claim 10 wherein:
the first step surface extends from the bowl peripheral edge to the second step surface and defines a step width dimension;
the second step surface extends from the first step surface to the rim inner peripheral surface and defines a step depth dimension;
a top land extends circumferentially around the piston center axis and defines a piston diameter dimension; and
each of the step width dimension and the step depth dimension is from about 3% to about 8% of the piston diameter dimension.

16. A piston crown for a piston in an internal combustion engine comprising:
a piston crown body including a piston outer surface having a top land and extending circumferentially around a piston center axis, a cooling gallery surface formed on a first axial side of the piston crown body, and a combustion face formed on a second axial side of the piston crown body;
the combustion face forming a combustion bowl having a center cone and a bowl peripheral edge, a circumferential rim extending radially outward to the piston outer surface and having a rim outer peripheral edge and a rim inner peripheral edge, and a step having a first step surface transitioning with the bowl peripheral edge and a second step surface transitioning with the rim inner peripheral edge;
the combustion face having a profile of rotation around the piston center axis that is varied to form jet-jet interaction limiters at spaced angular orientations around the piston center axis; and
the jet-jet interaction limiters each including a bowl component protruding, within the combustion bowl, and a step component protruding, within the step, to limit interaction between adjacent spray jets of combusting fuel within the combustion bowl and the step; and
the first step surface is formed in part upon the bowl component of each of the jet-jet interaction limiters, and the circumferential rim is formed in part upon the step component of each of the jet-jet interaction limiters.

17. The piston crown of claim 16 wherein the combustion face profile includes a limiter profile at locations of the jet-jet interaction limiters, and a base profile at locations circumferentially between the jet-jet interaction limiters, and the limiter profile is congruous with the base profile.

18. The piston crown of claim 16 wherein the top land defines a piston diameter dimension, and the step defines a step width dimension and a step depth dimension, and each of the step width dimension and the step depth dimension is from about 3% to about 8% of the piston diameter dimension.

19. The piston crown of claim 18 wherein:

the combustion bowl includes a bowl floor and a bowl outer wall extending from the bowl floor to the bowl peripheral edge;

the bowl component of each of the jet-jet interaction limiters extends axially between the bowl floor and the bowl peripheral edge, and radially inward from the bowl outer wall; and the step component extends axially between the first step surface and the rim inner peripheral edge and radially inward from the second step surface.

\* \* \* \* \*

UNITED STATES PATENT AND TRADEMARK OFFICE
CERTIFICATE OF CORRECTION

| | |
|---|---|
| PATENT NO. | : 11,274,628 B2 |
| APPLICATION NO. | : 16/889958 |
| DATED | : March 15, 2022 |
| INVENTOR(S) | : Jonathan William Anders et al. |

It is certified that error appears in the above-identified patent and that said Letters Patent is hereby corrected as shown below:

In the Specification

Insert the following immediately after the title at Column 1:
--Statement of Government Interest
This invention was made with government support under contract CRADA No. A18047 awarded by the DOE. The Government has certain rights in this invention.--

Signed and Sealed this
First Day of November, 2022

*Katherine Kelly Vidal*

Katherine Kelly Vidal
*Director of the United States Patent and Trademark Office*